US011791917B2

(12) United States Patent
Torrico

(10) Patent No.: US 11,791,917 B2
(45) Date of Patent: Oct. 17, 2023

(54) REAL-TIME PROPAGATION ANALYSIS FOR COMMUNICATIONS SYSTEMS

(71) Applicant: CommScope Technologies LLC, Hickory, NC (US)

(72) Inventor: Saul A. Torrico, Bethesda, MD (US)

(73) Assignee: CommScope Technologies LLC, Hickory, NC (US)

( * ) Notice: Subject to any disclaimer, the term of this patent is extended or adjusted under 35 U.S.C. 154(b) by 104 days.

(21) Appl. No.: 17/047,923

(22) PCT Filed: Apr. 15, 2019

(86) PCT No.: PCT/US2019/027475
§ 371 (c)(1),
(2) Date: Oct. 15, 2020

(87) PCT Pub. No.: WO2019/204200
PCT Pub. Date: Oct. 24, 2019

(65) Prior Publication Data
US 2021/0036792 A1 Feb. 4, 2021

Related U.S. Application Data

(60) Provisional application No. 62/658,250, filed on Apr. 16, 2018.

(51) Int. Cl.
*H04B 17/391* (2015.01)

(52) U.S. Cl.
CPC ............... *H04B 17/3911* (2015.01)

(58) Field of Classification Search
CPC .................................................. H04B 17/3911
See application file for complete search history.

(56) References Cited

U.S. PATENT DOCUMENTS

| 6,272,322 | B1 | 8/2001 | Su | |
| 7,096,173 | B1* | 8/2006 | Rappaport | H04B 17/391 455/448 |
| 2010/0222081 | A1 | 9/2010 | Ward et al. | |
| 2011/0287801 | A1* | 11/2011 | Levin | H04B 17/391 455/67.11 |

(Continued)

FOREIGN PATENT DOCUMENTS

KR    1020170129317 A    11/2017

OTHER PUBLICATIONS

Bertoni et al., "Predicting the Radio Channel Beyond Second-Generation Wireless Systems", IEEE Antennas and Propagation Magazine, Aug. 2005, pp. 28 through 40, vol. 47, No. 4, IEEE.

(Continued)

*Primary Examiner* — Natasha W Cosme
(74) *Attorney, Agent, or Firm* — Fogg & Powers LLC

(57) ABSTRACT

A method for providing real-time propagation analysis is provided. The method includes receiving a request for propagation analysis from a wireless communication device located at a specified geographic location, selecting a propagation model from a plurality of propagation models based on available databases for the geographic location, generating a path loss estimation using the selected propagation model, and providing the path loss estimation to the wireless communication device.

10 Claims, 10 Drawing Sheets

(56) References Cited

U.S. PATENT DOCUMENTS

2015/0092700 A1\* 4/2015 Li .................... H04W 16/14
370/329
2015/0257156 A1 9/2015 Bose et al.

OTHER PUBLICATIONS

Bertoni et al., "Propagation Prediction for Urban Systems", In Handbook of Antennas in Wireless Communications, 2002, pp. 1 through 38.
Eppink et al., "Tirem/SEM Handbook", Department of Defense, Electromagnetic Compatability Analysis Center, ECAC-HDBK-93-076, Mar. 1994, IIT Research Institute Under Contract to the Department of Defense.
International Bureau, "International Preliminary Report on Patentability from PCT Application No. PCT/US2019/027475", from Foreign Counterpart to U.S. Appl. No. 17/047,923, dated Oct. 29, 2020, pp. 1 through 12, Published: WO.
International Searching Authority, "International Search Report and Written Opinion from PCT Application No. PCT/US2019/027475", from Foreign Counterpart to U.S. Appl. No. 17/047,923, dated Aug. 6, 2019, pp. 1 through 16, Published: WO.
Okumura et al., "Field Strength and its Variability in VHF and UHF Land Mobile Service", Review of the Electrical Communication Laboratory, Sept.-Oct. 1968, pp. 825 through 873, vol. 16, Nos. 9-10.
Rappaport, "Wireless Communication Principles and Practice", 2002, Chapters 1-3, pp. 1 through 116, Prentice-Hall, Inc.
Rice et al., "Transmission Loss Predictions For Tropospheric Communication Circuits—vol. I", National Bureau of Standards Technical Note 101, Jan. 1967, pp. 1 through 197, U.S. Department of Commerce National Technical Information Service.
Rice et al., "Transmission Loss Predictions For Tropospheric Communication Circuits, vol. II", NBS Technical Note No. 101, 1967, pp. 1 through 212, U.S. Department of Commerce National Technical Information Service.
Torrico et al., "A Simplified Analytical Model to Predict the Specific Attentuation of a Tree Canopy", IEEE Transactions on Vehicular Technology, Mar. 2007, pp. 696 through 703, vol. 56, No. 2, IEEE.
Torrico et al., "Diffraction and Scattering of Trees and Houses on Path Loss in a Vegetated Residential Environment", 11th URSI Commission F Triennial Open Symposium on Radio Wave Propagation and Remote Sensing, 2007, pp. 1 through 8.
Torrico et al., "Modeling tree effects on path loss in a residential environment", IEEE Transactions on Antennas and Propagation, Jun. 1998, pp. 872 through 880, vol. 46, No. 6, IEEE.
Torrico et al., "Specific Attenuation Through a Tree Canopy: 3-D Vector Radiative Transport Approach", 12th URSI Commission F Triennial Open Symposium on Wave Propagation and Remote Sensing, at least as early as Jan. 28, 2011, p. 1.
Torrico et al., "Theoretical investigation of foliage effects on path loss for residential environments", Proceedings of Vehicular Technology Conference—VTC, Apr. / May 1996, pp. 854 through 858, IEEE.
Great Britan Intellectual Property Office , "Examination Report under Section 18(3), from GB Application No. GB2016354.9", dated Jan. 25, 2022, from Foreign Counterpart to U.S. Appl. No. 17/047,923, pp. 1 through 1, Published: GB.
Great Britain Intellectual Property Office, "Patents Act 1977: Examination Report under Section 18(3)" from GB Application No. 2016354.9 dated May 10, 2022, from Foreign Counterpart to U.S. Appl. No. 17/047,923, pp. 1 through 3, Published: GB.

\* cited by examiner

| Model Name | Terrain DB | Morphology DB | Permittivity/ Conductivity | Foliage DB | Resource DB |
|---|---|---|---|---|---|
| Model 1 | X | X | | | |
| Model 2 | X | | X | X | X |
| Model 3 | | X | | X | |
| | | | | | |
| Model N | X | X | X | X | X |
| User Model | | | | | |

FIG. 2B

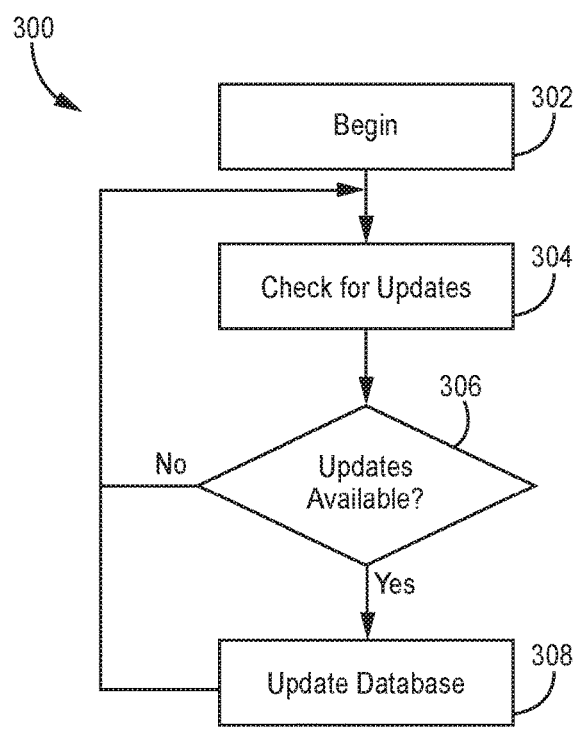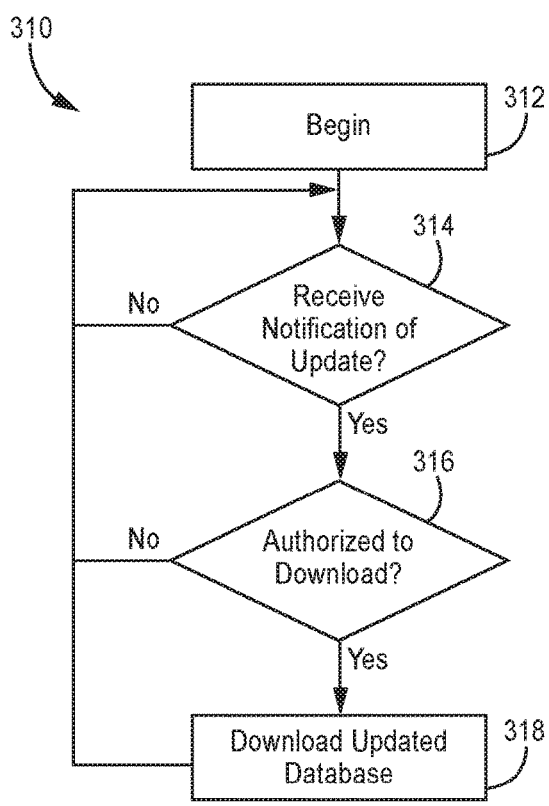
FIG. 3A
FIG. 3B

Real component of the effective propagation constant

Imaginary component of the effective propagation constant

REAL-TIME PROPAGATION ANALYSIS FOR COMMUNICATIONS SYSTEMS

This application claims priority to International Application No. PCT/US2019/027475, same title herewith, filed on Apr. 15, 2019, which claims priority to U.S. Provisional Application Ser. No. 62/658,250, same title herewith, filed on Apr. 16, 2018, the contents of both of which are incorporated in their entirety herein by reference.

BACKGROUND

Current spectrum sharing techniques (whether performed upfront in a design tool or actively in a cognitive sense) rely on a static representation or estimation of terrain and building morphology and utilize potentially several propagation models suitable to the environment. This generic approach to RF propagation analytics provides a general sense of the RF interference potential, but is inadequate to support an active and dynamic sharing environment.

One area of current development in wireless communication technology is cooperative spectrum sharing. In such arrangements, it is envisioned that spectrum currently designated for a single use will be shared between multiple uses. This will enable more efficient use of some prime spectral bands. For example, some wireless spectrum is currently allocated to the government for radar systems. However, the radar use is intermittent leading to inefficient use of this spectrum. With cooperative spectrum sharing, the government would share the spectrum with a service provider to effectively overlay a communications system on top of the radar system.

The systems of interest today include electronically steered phased array radar, MANET and small cell communications, and other wireless networks. Most of these systems are mobile and their architectures will evolve as new technologies become available. To optimize spectral performance and reduce standoff distance in a shared-spectrum environment, these mobile devices will need to adjust their operations to the changing RF propagation environment. This is not possible with current spectrum planning systems and methods.

Therefore, what is needed in the art is propagation analytics that provide adequate information to communication systems to enable more efficient use of the available, shared spectrum in view of the dynamic nature of the physical environment and the rapid changes in technology.

SUMMARY

A method for providing real-time propagation analysis is provided. The method includes receiving a request for propagation analysis from a wireless communication device located at a specified geographic location, selecting a propagation model from a plurality of propagation models based on available databases for the geographic location, generating a path loss estimation using the selected propagation model, and providing the path loss estimation to the wireless communication device.

DRAWINGS

FIG. 2B is a chart representing a database of a plurality of propagation models for use in selecting a propagation model.

FIGS. 3A and 3B are flow charts of embodiments of processes for updating database in the system for real-time propagation analysis of FIG. 1.

DETAILED DESCRIPTION

Figure 1:
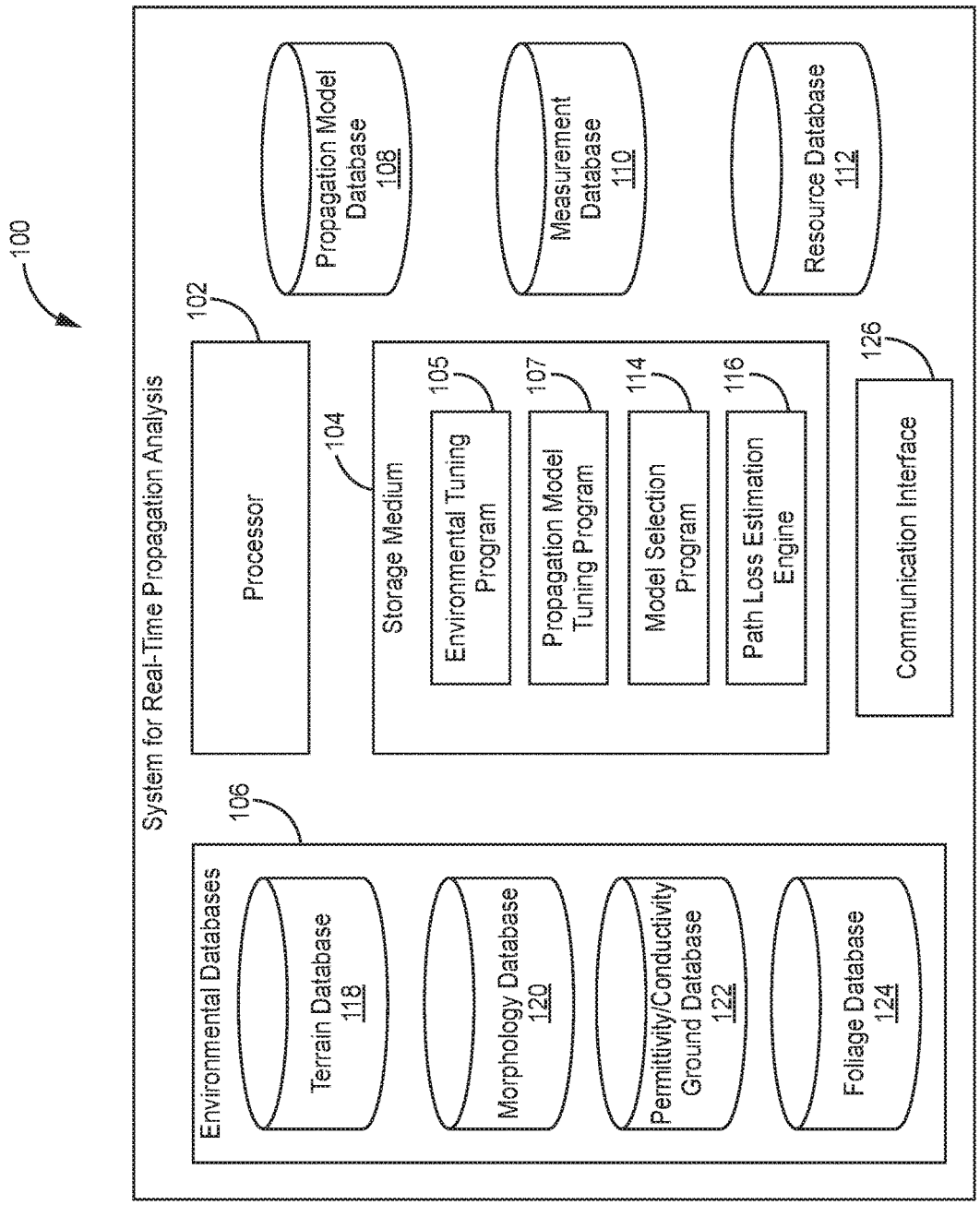
FIG. 1 is a block diagram of one embodiment for a system for real-time propagation analysis.

Dynamic spectrum access (DSA) technologies and techniques enable more efficient utilization of spectrum resources. However, many of these approaches and techniques could be improved by capturing several key RF characteristics of wireless systems in real-time. For example, propagation losses and standoff distances between interfering systems are needed to be able to effectively share the spectrum. Therefore, characterizing the RF channel in real-time can enable efficient sharing between present and future radars and communication networks. This enables not only sharing the spectrum, but also sensor command, real-time situational awareness, control planning and data access throughout the entire RF channel space. For purposes of this specification, the term "real-time" means that any latency is not material to the routine operation of the system.

There are several propagation models that could be used to assess the propagation channel in various environments. However, conventional models will only calculate the RF channel within its required bound of error by knowing the physical information of the channel based on the terrain and morphology data. Currently, there is no general modeling toolkit that can be applied to electromagnetic wave propagation calculations, in different types of environments that can calculate real-time multipath interference, propagation loss, and time delay, across the 2 GHz to 4 GHz spectrum.

Recognizing this limitation in the state of the art, we have developed an RF propagation model that interacts directly with terrain data and morphology data in real-time at the device level. Most existing propagation models simplify the electromagnetic wave propagation by empirically approximating the physical environment and the effect on propagation. To address these current limitations, we have developed a system with real-time interaction between a comprehensive RF propagation model based on the physical environment, and that is sufficiently general to allow for calculation of the RF channel characteristics for a large frequency range.

The System

Embodiments of the present invention provide a system for calculating the RF propagation channel in realistic environments to support spectrum sharing between radars and communications systems by creating a device level physics based propagation model. The system features realistic modeling of the environment by taking into consideration terrain elevations, terrain types, building structures, type of buildings, vegetation in urban/suburban environments as well as forests, and type of vegetation. Also, the system leverages the environmental factors to decide which propagation models are more suitable for the estimation of the propagation channel calculation based on frequency, refractivity profile, dielectric of the ground, type of climate, and transmitter and receiver heights relative to the environment. Advantageously, embodiments of this system are computationally scalable with a software architecture that allows it to be flexible to incorporate existing and future validated propagation models. In addition, the system is applicable to a number of embodiments for communication, radar, or other spectrum user.

Communication between a transmitter and a receiver in a real environment presents great challenges to a system designer. One of the major challenges is that oftentimes the environment obstructs the line-of-sight (LOS) communications between them. The behavior of the propagation of electromagnetic waves at a specific observation point is significantly affected by the environment causing RF diffraction, reflections, scattering and absorption. Therefore, embodiments of the present invention have been designed to properly assess the representation of the environment along the terrain profile with building and vegetation data. Embodiments of the present invention are designed to choose the appropriate algorithms within a comprehensive model to accurately estimate the propagation channel.

Embodiments of a system for real-time propagation analysis is illustrated in FIG. 1 and will be explained in detail below. The framework consists of the following: (1) physical realization of the environment including environmental and resource databases, (2) tuning of the environmental databases, (3) propagation models and RF field measurements to validate and, if necessary, tune the propagation models, and (4) an intelligent algorithm to select the appropriate RF model based on the physical realization of the environment. With the appropriate models selected, embodiments of the present invention can provide real-time calculation of the required system parameters to be used in, for example, a spectrum sharing solution.

FIG. 1 is a block diagram of one embodiment of a system for real-time propagation analysis indicated generally at 100 and constructed according to the teachings of the present invention. System 100 includes a number of programs that are stored on storage medium 104 and run by processor 102 to analyze the propagation characteristics of a communication channel of a communication system in real time. In one embodiment, the storage medium is a non-transitory computer readable medium as described in more detail below. Additionally, system 100 includes a number of databases that hold data that is used by the programs to perform the necessary calculations to provide the propagation analysis. These databases include a number of environmental databases 106 as well as a database of propagation models 108.

Further, system 100 also includes, in some embodiments, a measurements database 110 and a resource database 112. The measurements database 110 includes measurements of RF data associated with specified locations and communication channels of the communications system. The resource database 112 includes information on the location, height and frequencies of operation for a number of transceivers associated with the communication system.

In one aspect, system 100 is a dynamic tool for real-time propagation analysis. As more data becomes available, the various databases of system 100 are updated or tuned with the new data. This aspect of system 100 is discussed in more detail below with respect to FIGS. 3A, 3B, 4A, and 4B. For example, as more environmental data is developed for the geographic region of the communication system, the environmental databases are updated or tuned. Further, propagation models may be added or modified based on information such as RF measurements added to the measurements database 110. Finally, as resources (such as transceivers, base stations or the like) are added to the communication system, that data is added to the resource database 112. By continually updating the databases, system 100 is able to improve the propagation analysis provided to the communication system.

System 100 includes several programs in storage medium 104 that control the operation of system 100. For example, environmental tuning program 105 is included in some embodiments, to tune or update the data in environmental databases 106. These databases include terrain database 118, morphology database 120, permittivity/conductivity ground database 122 and foliage database 124. Environmental databases 106 include information that can be used by a propagation model to determine a path loss value based on known information for a selected path of a communication channel. As additional information becomes available for these databases, environmental tuning program 105 updates the appropriate databases so that system 100 is able to provide improved propagation analysis.

System 100 also includes propagation model tuning program 107 that is stored on storage medium 104. In a similar manner, as updates are made to the propagation models in propagation model database 108, propagation model tuning program 107 updates the propagation models to reflect improvements made to the models. In some embodiments, propagation model tuning program 107 uses data in measurement database 110, when updated, to modify the propagation models in propagation model database 108.

System 100 also includes model selection program 114. Model selection program 114 is used to select from among the various propagation models stored in propagation model database 108 to be used to determine the path loss estimation for a particular connection to be made in the communication system. In one embodiment, the model selection program uses the protocol described below with respect to FIGS. 2A and 2B.

System 100 also includes path loss estimation engine 116. Path loss estimation engine 116 uses the propagation model selected by model selection program 114 to calculate a path loss estimation for use in the communication system. In one embodiment, the selected propagation model uses data from the environmental databases 106 and the resource database 112 to calculate or estimate the expected path loss and other parameters for a communication channel between wireless devices of the communication system. This information is then provided by system 100 to an entity of the communication system at communication interface 126. For example, the path loss estimation, in one embodiment, is passed to a processor of a wireless terminal (such as a mobile phone) for use in establishing a connection with a base station. Alternatively, system 100, in another embodiment, is resident on a base station, a mobile switching center, or a spectrum manager. In these embodiments, the system 100 provides the path loss estimation over communication interface 126 to the base station, mobile switching center or spectrum manager for use by the communication system for controlling communications between entities within the communication system.

Figure 1A:
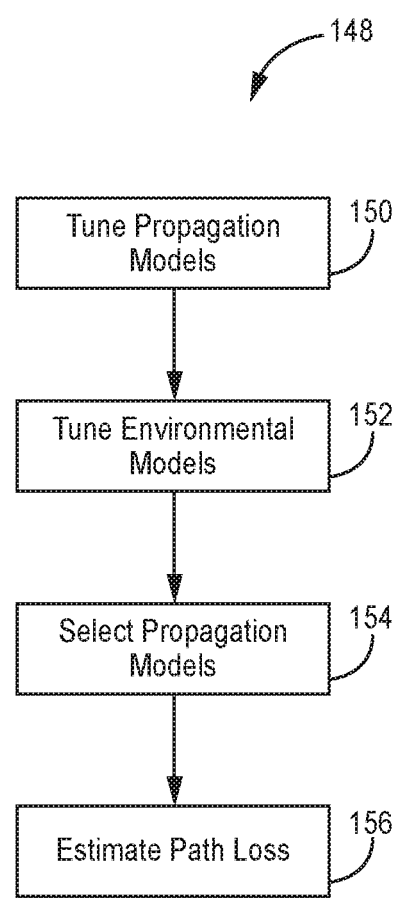
FIG. 1A is a flow chart of one embodiment of a process for real-time propagation analysis for the system of FIG. 1.

In operation, system 100 provides real-time propagation analysis for a communication system or device according to a process 148 shown in FIG. 1A. The process 148 begins at block 150 wherein system 100 tunes one or more propagation models. For example, system 100 may tune one ore more propagation models in propagation model database 108 using propagation model tuning program 107 and processor 102. In one embodiment, system 100 uses the process described in conjunction with FIGS. 4A and 4B to tune or update the propagation models.

At block 152, process 148 tunes the environmental databases 106 to bring the databases up to date with any current information. For example, system 100 tunes one or more of the environmental databases 106 using environmental tuning program 105 and processor 102. In one embodiment, process 148 tunes or updates the environmental databases 106 using the process described below with respect to FIGS. 3A and 3B.

At block 154, process 148 selects the propagation model to be used for real-time propagation analysis. For example, system 100 selects an appropriate propagation model from propagation model database 108 using model selection program 114 and processor 102. In one embodiment, process 148 selects the propagation model using the process described below with respect to FIGS. 2A and 2B.

Finally, at block 156, process 148 estimates or calculates the path loss for communication between two wireless devices, such as a wireless terminal and a base station using the selected propagation model. In one embodiment, the path loss is estimated by path loss estimation engine 116 running on processor 102 of system 100.

Propagation Model Selection

Figure 2A:
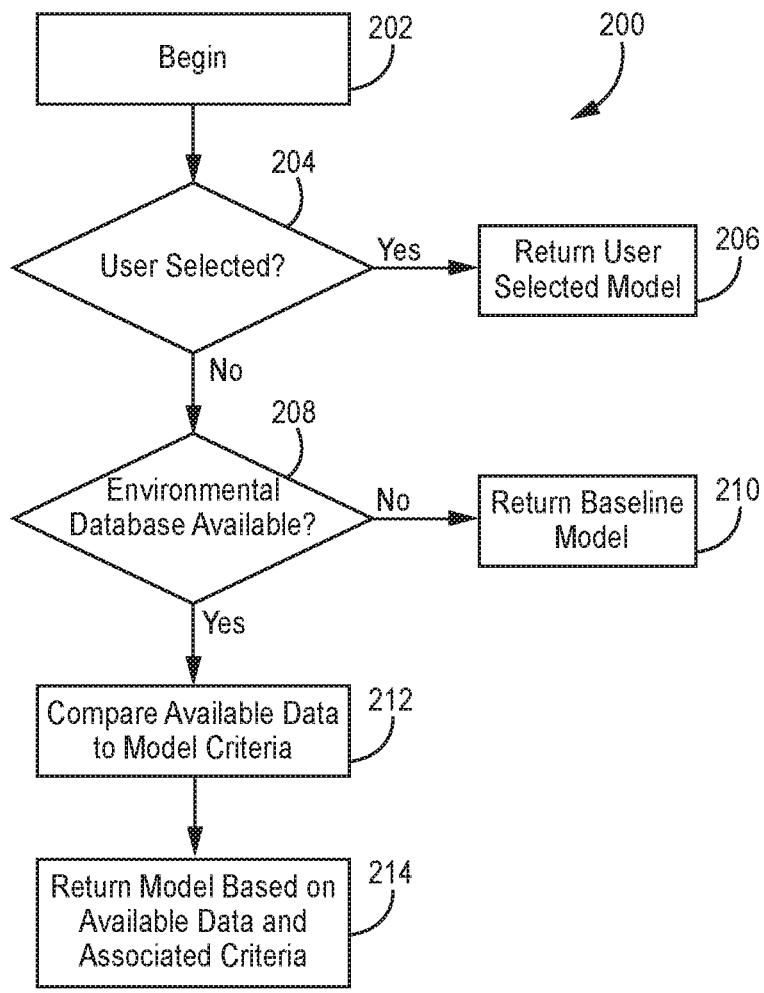
FIG. 2A is a flow chart of one embodiment of a process for selecting a propagation model from a plurality of propagation models for real-time propagation analysis.

FIG. 2A is a flow chart of one embodiment of a process for selecting a propagation model for real-time propagation analysis. In one embodiment, process 200 of FIG. 2A forms the basis of model selection program of FIG. 1.

Process 200 begins at block 202. At block 204, process 200 determines whether there is a user selected propagation model associated with a request for a path loss calculation. If so, the process returns the user selected propagation model at block 206. If however, there is no user selected propagation model, process 200 continues to block 208.

At block 208, process 200 determines which environmental databases are available. If no databases are available, process 200 returns a baseline model at block 210. If, however, environmental databases are available, process 200 proceeds to block 212 and compares the available databases to the criteria for the available models in the propagation model database. Process 200 returns a model based on a match between the available databases and the data required for the propagation model. For example, as shown in FIG. 2B, a table 216 includes a list of the available models (column 218) and the various databases (columns 220) that are used by each model (indicated by an "X" in the row for a model and the column for the database). Process 200, in one embodiment, looks in table 216 for one or more models that correspond with the available databases. For example, if the system only has terrain and morphology databases available, process 200 would return Model 1 as the selected propagation model.

Tuning (Updating) Databases

The various databases of system 100 are updated from time-to-time to improve the performance of system 100. FIGS. 3A and 3B illustrate embodiments for processes for updating or tuning the databases. The processes of FIGS. 3A and 3B can form the basis for environmental tuning program 105 of FIG. 1.

Process 300 of FIG. 3A begins at block 302. Process 300 checks for updates at block 304. For example, process 300 checks to determine if updates are available for one or more of a terrain database, a morphology database, a permittivity/conductivity ground database, or a foliage database. Process 300 determines if updates are available at block 306. If updates are not available, process 300 returns to 304 to repeat the process of checking for updates until updates are available. When an update is available, process 300 proceeds to block 308 and downloads the appropriate database. Process 300 then returns to block 304. In this manner, environmental databases 106 of FIG. 1, for example, are updated when new data is available.

Process 310 of FIG. 3B illustrates an alternate embodiment of a process for updating or tuning a database for a system such as system 100 of FIG. 1. In this embodiment, process 310 begins at block 312. At block 314, process 310 determines whether a notification of an available update has been received. If not, the process returns to block 314 to continue to check for notifications of updates.

If at block 314, process 310 determines that a notification has been received, process 310 checks to verify that it is authorized to download the update at block 316. If the download is authorized, process 310 downloads the update at block 318. If the process is not authorized to download the update, then process 310 does not download the update at block 316 and returns to block 314.

Figure 4A:
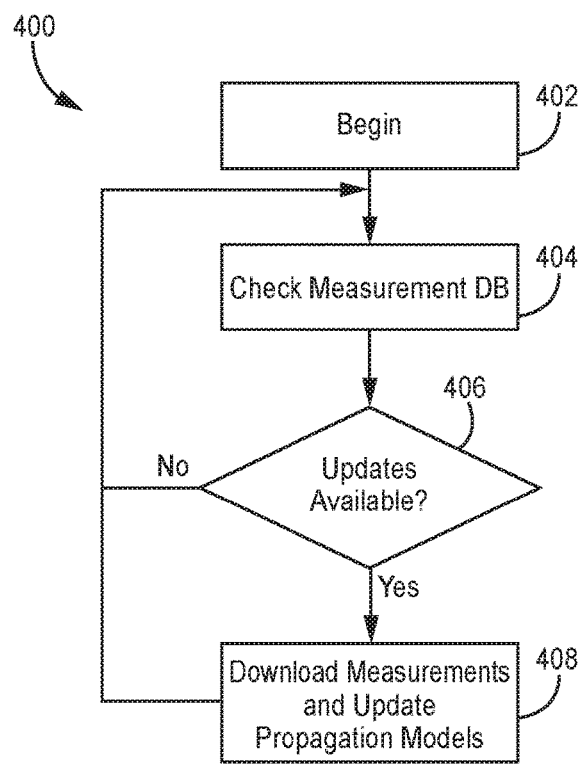
FIGS. 4A and 4B are flow charts of embodiments of a process for updating propagation models for the real-time propagation model of FIG. 1.
Figure 4B:
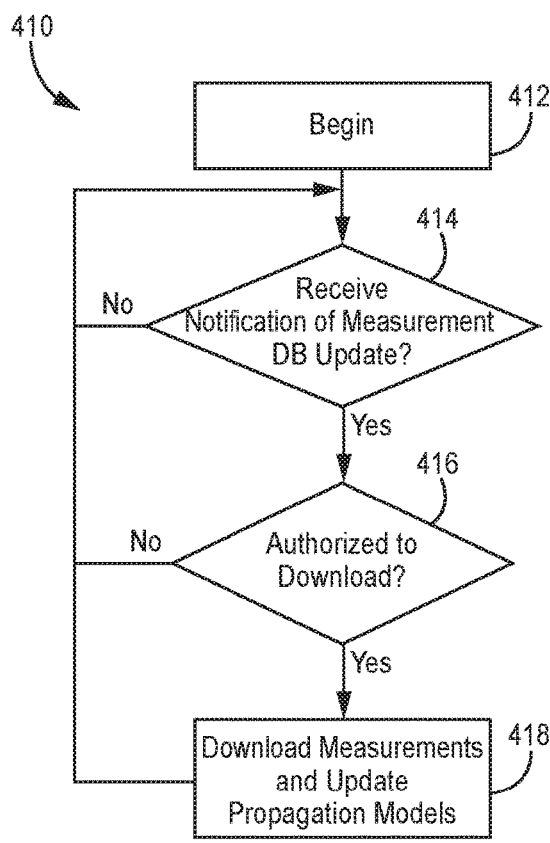

FIGS. 4A and 4B illustrates processes for updating or tuning the propagation models of a system for real-time propagation analysis such as system 1 of FIG. 1. The processes of FIGS. 4A and 4B can form the basis for propagation model tuning program 107 of FIG. 1.

Process 400 of FIG. 4A begins at block 402. Process 400 checks for updates at block 404. For example, process 400 checks to determine if updates are available for a measurement database. Process 400 determines if updates are available at block 406. If updates are not available, process 400 returns to 404 to repeat the process of checking for updates until updates are available. When an update is available, process 400 proceeds to block 408 and downloads the appropriate database. Process 400 then uses the updated measurement data to update propagation models in the propagation model database. Process 400 then returns to block 404. In this manner, measurement database 110 and propagation model database 108 of FIG. 1, for example, are updated when new data is available.

Process 410 of FIG. 4B illustrates an alternate embodiment of a process for updating or tuning a database for a system such as system 100 of FIG. 1. In this embodiment, process 410 begins at block 412. At block 414, process 410 determines whether a notification of an available update for a measurement database has been received. If not, the process returns to block 414 to continue to check for notifications of updates.

If at block 414, process 410 determines that a notification has been received, process 410 checks to verify that it is authorized to download the update at block 416. If the download is authorized, process 410 downloads the update at block 418. Process 410 then uses the updated measurement data to update propagation models in the propagation model database. If process 410 is not authorized to download the update, then process 410 does not download the update at block 416 and returns to block 414.

Embodiments Using Real-Time Propagation Analysis

Real-time propagation analysis can be used in a number of contexts to improve the performance of wireless communication systems. Embodiments of the system for real-time propagation analysis can be disposed at various locations in the wireless communication systems or networks. For example, in some embodiments, the system for real-time propagation analysis can be instantiated in a chip that resides in a network module such as a spectrum manager, base station or mobile switching center in a communication network that supports spectrum access sharing. Alternatively in other embodiments, the system can be instantiated on a chip that resides on a mobile communication device such as a mobile phone. A couple of example embodiments follow.

Figure 5:
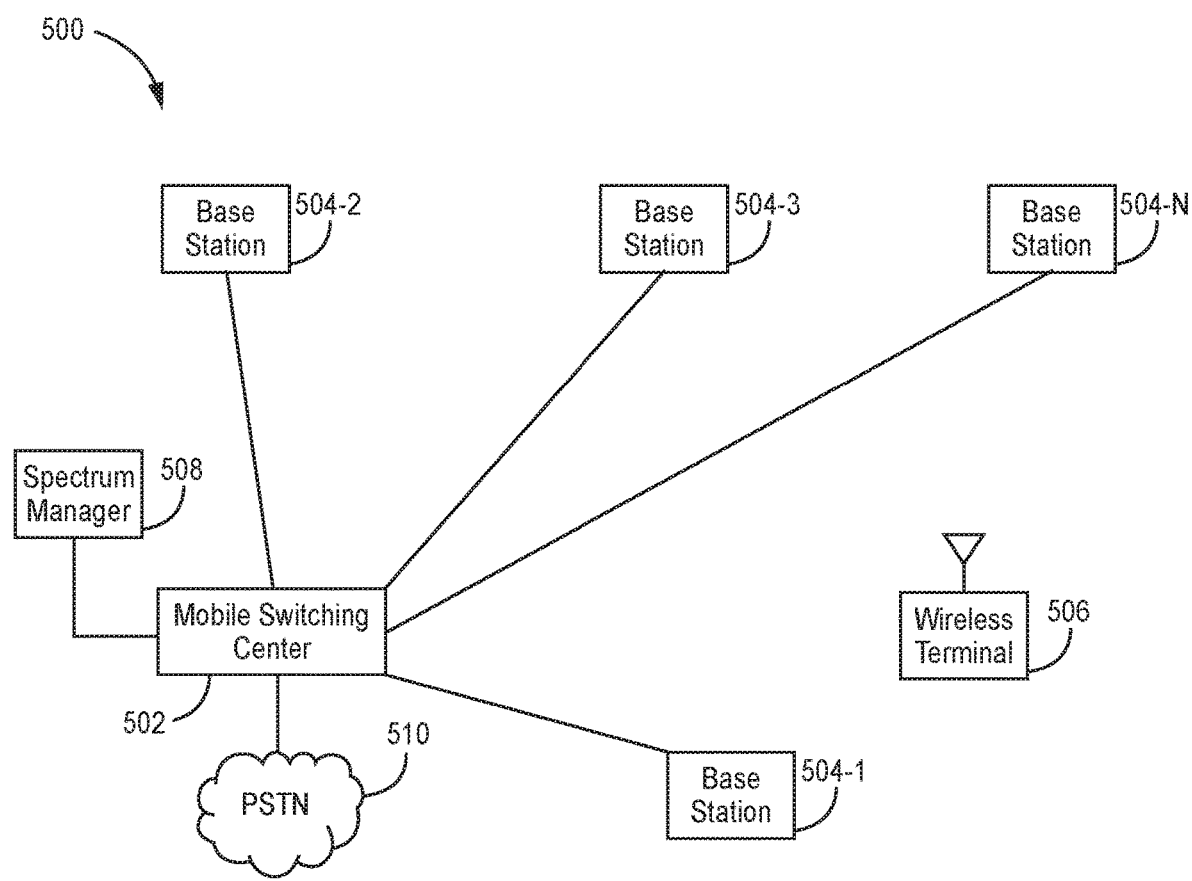
FIG. 5 is a block diagram of one embodiment of a wireless communication system with shared spectrum that uses real-time propagation analysis with a database of dynamic propagation models and supporting databases using, for example, the system of FIG. 1.

FIG. 5 is a block diagram of a wireless communication system, indicated generally at 500, with shared spectrum that uses real-time propagation analysis with a database of dynamic propagation models and supporting databases using, for example, the system of FIG. 1. Spectrum sharing systems sense the RF environment and dynamically adapt to initiate and maintain reliable communications between users while minimizing harmful interference. Embodiments of the present invention provide these networked systems and their spectrum management software with real-time propagation analytics to dynamically adjust their operations, in addition to their other protocols, to the changing RF path loss between transmitters, receivers and interferers.

Embodiments of the present invention provide a Real-Time, Multi-Mode Path Loss Engine as a complimentary technology to Radio Map; mapping the RF spectrum across frequency, geography and time. As another tool for the spectrum manager, the technology described herein aids the secondary spectrum user avoid interfering with primary systems in a congested and shared RF environment.

Finally, embodiments of the present invention may help to address the issue of hidden nodes by optimizing the spectral efficiency of the transmitters in the vicinity of unknown receivers.

Communication system 500 includes mobile switching center 502 that is coupled to a plurality of base stations 504-1 to 504-N. Mobile switching center 502 is also coupled to a network, such as the public switched telephone network, 510. In this embodiment, the communication system is a communication system that shares access to assigned bandwidth with one or more communication systems or other systems that use the same bandwidth according to a priority scheme. Access to the spectrum is controlled by spectrum manager 508. Communication system 500 enables wireless terminals, such as wireless terminal 506, to communicate with network 510.

Advantageously, communication system 500 includes a system for real-time propagation analysis, such as system 100 of FIG. 1, to aid in establishing and controlling communication channels between wireless terminals 506 and base stations 504. To this end, the system for real-time propagation analysis, such as system 100 of FIG. 1, is instantiated on one or more of wireless terminal 506, base stations 504, mobile switching center 502 or spectrum manager 508. The system for real-time propagation analysis functions, for example, as described above with respect to FIGS. 1, 2A, 2B, 3A, 3B, 4A, and 4B.

Figure 5A:
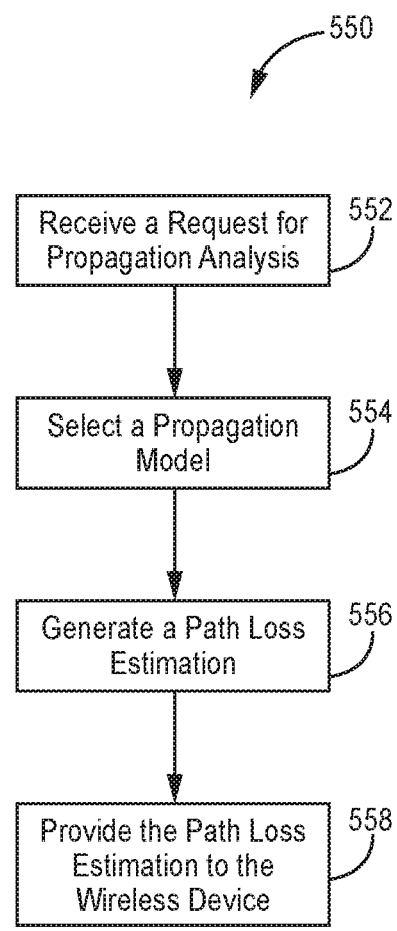
FIG. 5A is a flow chart of one embodiment of a process for providing real-time propagation analysis for a wireless device.

In operation, system 500 uses real-time propagation analysis for communication between wireless terminal 506 and any of base stations 504. In one embodiment, system 500 uses process 550 of FIG. 5A to provide the real-time propagation analysis. Process 550 begins at block 552 by receiving a request for propagation analysis. The request can be generated at wireless terminal 506, base station 504, mobile switching center 502 or spectrum manager 508. At block 554, process 550 selects a propagation model based on available databases for the geographic location of the planned communication. In one embodiment, process 550 uses the process of FIGS. 2A and 2B to select the propagation model.

At block 556, process 550 generates a path loss estimate using, for example, path loss estimation engine 116 of FIG. 1. At block 558, the path loss estimate is provided to the wireless device for use in communicating in system 500.

Figure 6:
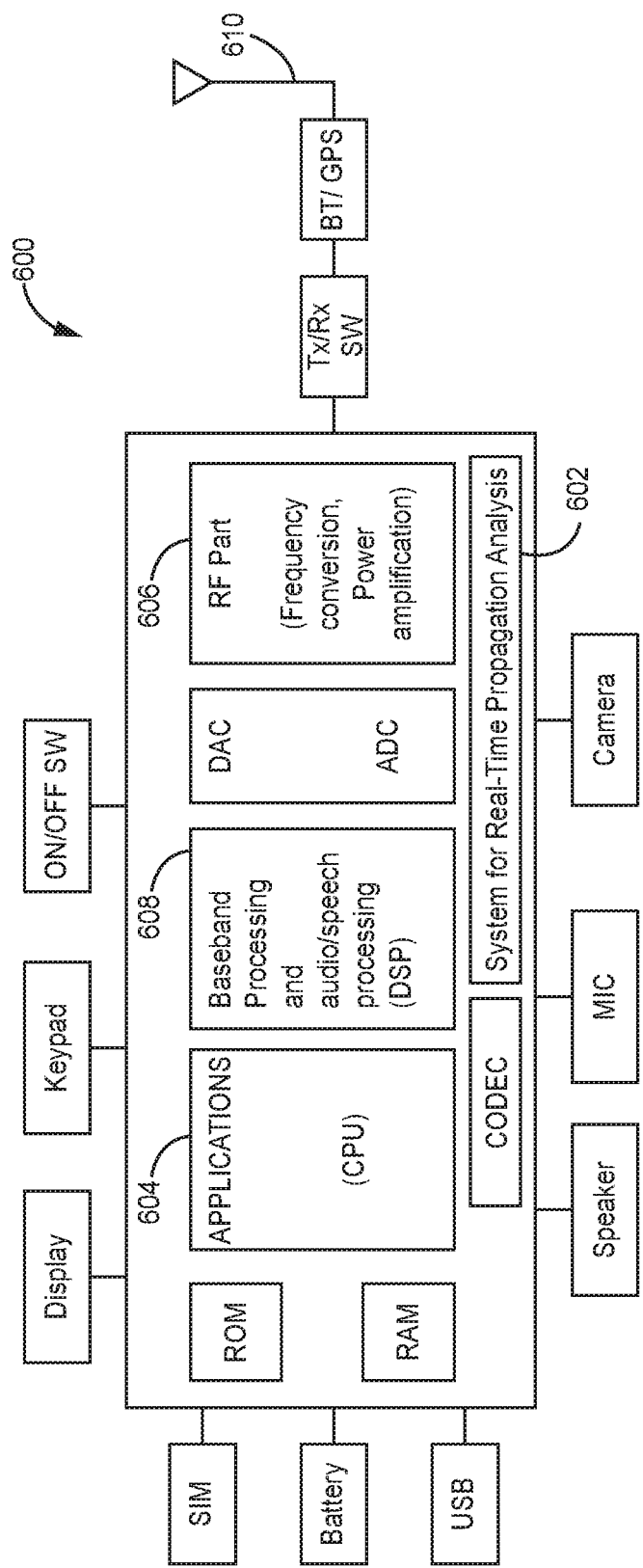
FIG. 6 is a block diagram of a wireless terminal with an on-chip system for real-time propagation analysis.

FIG. 6 is a block diagram of a wireless terminal, indicated generally at 600, with an on-chip system for real-time propagation analysis 602. Wireless terminal 600 includes many conventional components for communicating with a wireless communication network. For example, wireless terminal 600 includes a radio frequency (RF) module 606 that communicates with the wireless communication network via antenna 610. Additionally, wireless terminal includes a baseband processor 608 that is coupled to the RF module. In one embodiment, system 602 comprises an instantiation of system 100 of FIG. 1. CPU 604 of wireless terminal 600 uses system 602 to assist in establishing and maintaining a communication channel with a wireless communication network through baseband processor 608, RF module 606 and antenna 610. System 602 selects an appropriate propagation model from a plurality of propagation models in order to estimate path loss for communication between the wireless terminal 600 and a base station or other wireless communication device. As with the system of FIG. 1, system 602 includes a number of databases, such as environmental databases 106 and propagation model database 108. This enables wireless device 600 to accurately determine the path loss for a communication channel and thereby allow adjustment of parameters, such as transmission properties of at least one of the RF module 606 and the baseband processor 608, to assure that wireless terminal 600 can communicate effectively with another wireless communication device.

Propagation Models

The physical-based environment will integrate high resolution terrain data with morphology data such as forest, houses, and mixed houses and trees. Buildings are characterized by height above ground, and vegetation by its effective dielectric characteristics and height. The effective dielectric characteristic of vegetation is characterized by simulations of different type of trees and by knowing the biophysical and dielectric constant of branches and leaves of the tree canopies. In many situations, average information about trees will be used to obtain the electrical characteristics of the tree canopy.

Figure 7:
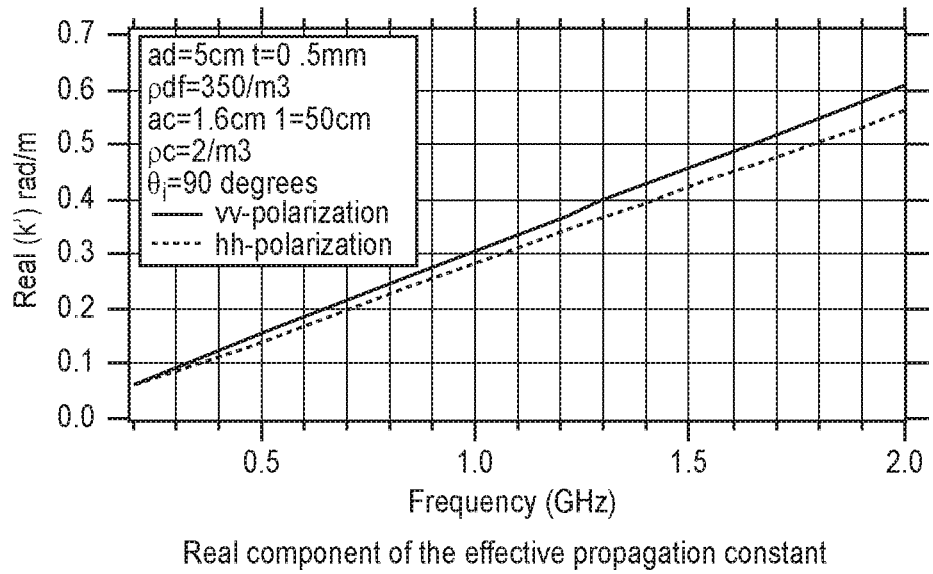
FIGS. 7 and 8 are graphs that illustrate the real and imaginary components of propagation constants for trees over a selected frequency range.
Figure 8:
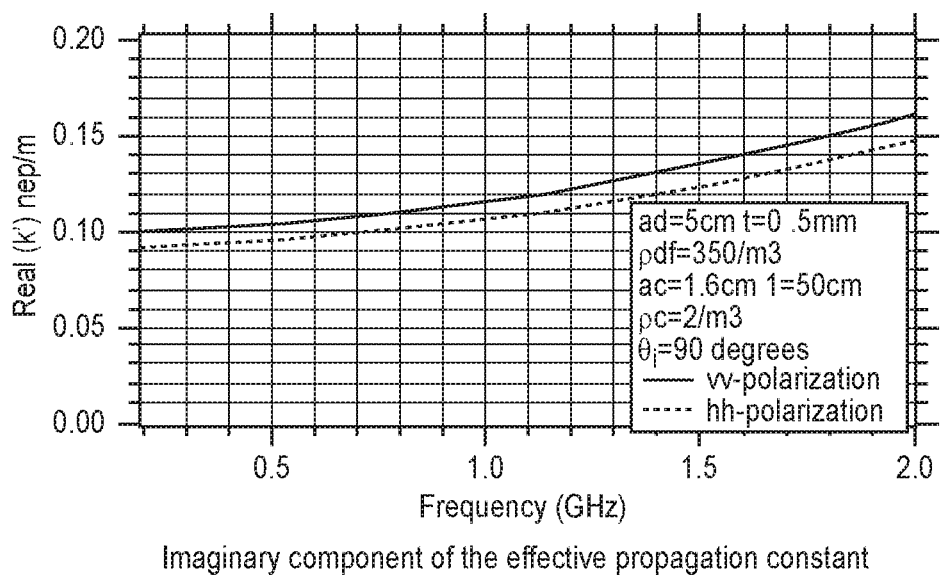

In this effort, the trees will be identified as being coniferous or deciduous. Each type of tree will be characterized by the type of leaves and branches, the relative dielectric constants of branches and leaves based on frequency, and the probability distribution of branches and leaves. If such information is not available, then average information will be used based on similar tree types. With the aim of creating a vegetation database which associates the tree type with the specific attenuation of a tree up to 4 GHz, embodiments of the present invention use the multiple scattering theory of Foldy-Lax to compute the propagation constants of trees as outlined in S. A. Torrico, H. L. Bertoni, and R. H. Lang, "Theoretical investigation of foliage effects on path loss for residential environments," in Proc. IEEE Veh. Technol. Conf., Atlanta, Ga., pp. 854-858, 1996 and shown as an example in FIGS. 7 and 8. In this approach, to characterize the attenuating and scattering fields of a tree, trees are represented as an ensemble of leaves and branches all having prescribed location and orientation statistics. Leaves are modeled as flat, circular and lossy-dielectric discs and branches are modeled as finitely long, circular, lossy-dielectric cylinder. The integrated result of the effective dielectric constant of trees leads to a database of specific attenuations for different types of trees.

The propagation models used by embodiments of the present invention include the interaction of terrain, building, and vegetation-based propagation models to more realistically calculate the propagation loss in a 3-D environment, as given in references.

Terrain-Based Propagation Models

There are two well-known terrain-based propagation models, Terrain-Integrated Rough Earth Model (TIREM) and the Irregular Terrain Model (ITM). These models calculate propagation losses between a transmitter and receiver based on terrain data only.

Terrain-Integrated Rough-Earth Model (TIREM)

TIREM was developed and designed to calculate the propagation loss between two geographic points over irregular terrain for RF signals operating between 1 and 20 GHz and is based on geometrical optics theory. For input, TIREM uses a data file that describes the terrain profile with multiple discrete data points between the 2 endpoint sites. Each discrete data point specifies its location along the path with its ground elevation above mean sea level and its distance from the transmitter. In addition to the terrain profile data, TIREM requires the input file to include antenna heights at each end point, frequency and polarization of the RF signal, atmospheric constants (surface refractivity and humidity), and ground dielectric constants (relative permittivity and conductivity). Among the propagation modes that TIREM considers are free space, diffraction, and troposcattering. For low frequencies (1-300 MHz), TIREM considers ground waves as part of the analysis. Currently TIREM relies on approximation techniques such as calculating the first order of the Van der Pol-Bremmer series solution to compute diffraction over irregular terrain. Additional TIREM limitations include, but are not limited to the following observations, TIREM does not include morphology data, such as buildings and vegetation, nor attenuation due to rain when calculating losses.

The Irregular Terrain Model (ITM)

The Irregular Terrain Model, commonly referred to as the Longley-Rice model, is a terrain based model that presents a comprehensive method of calculating the long term loss for a wide range of frequencies up to 60 GHz. Calculation of the long term path-loss by ITM is based on geometrical optics ray theory. ITM uses as inputs a terrain profile described by a number of discrete points, the position of which is specified by a distance from the transmitter and an elevation above mean sea level. As TIREM, the ITM model considers different type of modes to compute diffraction over a single ridge or double ridge, etc. However, one of the biggest differences between the TIREM model and the ITM model is the use of the effective antenna heights by ITM. The ITM model is computationally as intensive as the TIREM model.

Terrain-Buildings Based Model

The only propagation model that is based on terrain and buildings is the modified COST231-Bertoni-Walfish-Ikegami model. The Modified COST231-Bertoni-Walfish-Ikegami model is a physics-based model that has been developed based on the COST231-Bertoni-Walfish-Ikegami model. The COST231-Bertoni-Walfish-Ikegami model calculates, in the microwave frequency range, the propagation loss in an urban or suburban environment where buildings are a major contributing factor to the propagation loss. The model was validated with RF measurements performed by COST group 231.

Terrain-Building-Vegetation Based Models

The two models that calculate propagation losses between a transmitter and receiver based on terrain, buildings and vegetation data are the Okumura-Hata-COST231-ITU model, and the Hybrid Torrico-Bertoni-Lang model.

Okumura-Hata-COST231-ITU Model

The Okumura-Hata-COST231-ITU model is included as part of the path-loss estimation engine because it is widely recognized and used by the telecommunication industry as well as by government agencies. The model is a statistical model because it has been derived from actual RF measurements. The propagation measurements were performed by Okumura in Tokyo, Japan in the frequency range between 100 and 1500 MHz. The statistical analysis of these measurements was used to determine distance and frequency dependence on the path loss, local variability, and antenna height gain factors. Based on these measurements, Hata and the COST231 research group developed a set of formulas to calculate the path-loss. The ITU modified the model to extend the coverage beyond 20 kilometers. The model covers different types of morphologies and terrain profiles.

Hybrid Torrico-Bertoni-Lang Model

The Hybrid Torrico-Bertoni-Lang point-to-point model is a combination of the Torrico-Bertoni-Lang Model, Modified COST231-Bertoni-Walfisch-Ikegami Model, and the Modified Longley-Rice Model. All of these models are complementary to each other. The Hybrid Torrico-Bertoni-Lang model considers terrain data, building data, and vegetation data to compute the propagation loss in different scenarios and environments. The propagation loss calculation is done by separating the terrain data processing module and the propagation loss module.

The terrain data processing module includes a detailed analysis of the environmental databases and its representation/characterization of the data to be used by the propagation module. The propagation module follows the footsteps of the Modified COST231-Bertoni-Walfisch-Ikegami Model and the Torrico-Bertoni-Lang Model and is deemed as an extension of these models. However, the Torrico-Bertoni-Lang model is used as the theoretical basis since the inclusion of buildings/houses, vegetation, and terrain profile is inherent in the model. In the Hybrid Torrico-Bertoni-Lang model, the behavior of the diffracted fields due to terrain and buildings/houses in the presence of vegetation is associated with the effective specific attenuation of trees, which can be obtained from a vegetation database. The propagation model bridges the gap between tree attenuation, tree scattering, and diffraction. The terrain obstructions are computed based on the Modified Longley-Rice model.

The Hybrid Torrico-Bertoni-Lang point-to-point propagation model is applicable for the 2 GHz to 4 GHz frequency range and can be extended for higher and lower frequencies. Among the strengths of the Hybrid Torrico-Bertoni-Lang model are fast computational time, morphology and terrain integration, and has been calibrated from the results of RF measurements.

Note that the propagation models discussed above are typically used for theoretical and laboratory analysis, system design and architecture. Embodiments of the present invention, advantageously use the propagation models for real-time, multi-mode path loss estimation to improve spectral performance for spectrum sharing.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium or "non-transitory computer readable medium" tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

EXAMPLE EMBODIMENTS

Example 1 includes a method for real-time propagation analysis, the method comprising: tuning a number of propagation models using measured radio frequency (RF) characteristics; tuning one or more environmental databases; selecting a propagation model based on the tuned one or more environmental databases and the tuned propagation models; and estimating a path loss for communicating between wireless devices using the selected propagation model.

Example 2 includes the method of Example 1, wherein tuning a number of propagation models comprises updating at least one propagation model based on new measurement data in a database of RF measurements.

Example 3 includes the method of any of Examples 1-2, wherein tuning one or more environmental databases comprises tuning one or more of a terrain database, a morphology database, a permittivity/conductivity ground database and a foliage database.

Example 4 includes the method of any of Examples 1-3, wherein selecting a propagation model comprises selecting a propagation model based on the availability of one or more databases for the geographic region including a terrain database, a morphology database, a permittivity/conductivity database, a foliage database, a measurement database, and a resource database.

Example 5 includes the method of any of Examples 1-4, wherein estimating a path loss comprises applying data from the one or more environmental databases in a path loss estimation program along with resource data, including but not limited to, height of a transmitter or receiver, frequency, and location of one or more wireless devices.

Example 6 includes a system for real-time propagation analysis, the system comprising: a plurality of dynamic environmental databases; a dynamic propagation model database; a measurement database; a resource database; a processor; a non-transitory computer readable medium, coupled to the processor, the non-transitory computer readable medium for storing a plurality of programs for running on the processor, the programs including: a path loss estimation engine that, when run on the processor, calculates propagation losses for communication between wireless devices using the plurality of dynamic environmental databases and the dynamic propagation model database.

Example 7 includes the system of Example 6, and further including an environmental tuning program, stored on the non-transitory computer readable medium, that, when run on the processor, causes the processor to tune one or more of the plurality of dynamic environmental databases based on new environmental information.

Example 8 includes the system of Example 7, and further including a propagation model tuning program, stored on the non-transitory computer readable medium, that, when run on the processor, causes the processor to update at least one propagation model in the dynamic propagation model database based on new measurement data in the measurement database.

Example 9 includes the system of any of Examples 6-8, wherein the measurement database is a database that includes radio frequency measurements for communication channels for specified geographic regions.

Example 10 includes the system of any of Examples 6-9, wherein the resource database is a database that includes information on the location, height and frequencies of operation for a number of transceivers associated with a communication system.

Example 11 includes a method for providing real-time propagation analysis, the method comprising: receiving a request for propagation analysis from a wireless device located at a specified geographic location; selecting a propagation model from a plurality of propagation models based on available databases for the geographic location; generating a path loss estimation using the selected propagation model; and providing the path loss estimation to the wireless device.

Example 12 includes the method of Example 11, wherein selecting the propagation model comprises selecting a propagation model based on the availability of one or more databases for the geographic region including a terrain database, a morphology database, a permittivity/conductivity database, a foliage database, a measurement database, and a resource database.

Example 13 includes the method of any of Examples 11-12, and further comprising selectively tuning the propagation models when updated radio frequency (RF) measurement data is available.

Example 14 includes the method of any of Examples 11-13, wherein selecting a propagation model comprises selecting a propagation model based on the availability of one or more of a terrain database, a morphology database, a permittivity/conductivity database, and a foliage database.

Example 15 includes the method of Example 14, and further comprising tuning each of said databases when additional data is available.

Example 16 includes the method of any of Examples 11-15, wherein selecting a propagation model comprises selecting a propagation model that has been previously tuned to the geographic location based on RF measurements.

Example 17 includes the method of any of Examples 12-16, wherein generating a path loss estimation comprises applying data from one or more of the available data bases in a path loss estimation program along with resource data, including but not limited to, height of a transmitter or receiver, frequency, and location of one or more wireless devices.

Example 18 includes a wireless communication device, comprising: a radio frequency (RF) module that is configured to communicate with a wireless network; a baseband processor, coupled to the radio frequency module; and a system for real-time propagation analysis that uses a propagation model tuned for the geographic location of the device to provide real-time adjustments to transmission properties of at least one of the RF module and the baseband processor.

Example 19 includes the device of Example 18, wherein the system for real-time propagation analysis comprises: a processor; a non-transitory computer readable medium, coupled to the processor, the non-transitory computer readable medium for storing a plurality of programs for running on the processor, the programs including: a path loss estimation engine that, when run on the processor, calculates propagation losses for communication with other wireless devices using a plurality of dynamic environmental databases and a dynamic propagation model database.

Example 20 includes a spectrum access system, comprising: a spectrum manager; a plurality of base stations in communication with the spectrum manager; and a path loss estimation engine that is configured to provide real-time propagation loss calculations for a communication channel between at least one of the plurality of base stations and a mobile device to assist in setting communication parameters for the mobile device to communicate over the communication channel.

Example 21 includes the spectrum access system of Example 20, wherein the path loss estimation engine is coupled to the spectrum manager.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method for real-time propagation analysis, the method comprising:
tuning a number of propagation models using measured radio frequency (RF) characteristics;
tuning one or more environmental databases;
selecting a propagation model in real-time, from among a plurality of available models, the selection of the propagation model based on which of the tuned one or more environmental databases are available for use by the selected propagation model;
estimating a path loss in real-time for a communication channel between wireless devices using the selected propagation model and available ones of the environmental databases; and
adjusting parameters of at least one of the wireless devices based on the estimated path loss from the selected propagation model to enable communication between the wireless devices over the communication channel.

2. The method of claim 1, wherein tuning a number of propagation models comprises updating at least one propagation model based on new measurement data in a database of RF measurements.

3. The method of claim 1, wherein tuning one or more environmental databases comprises tuning one or more of a terrain database, a morphology database, a permittivity/conductivity ground database and a foliage database.

4. The method of claim 1, wherein selecting a propagation model comprises selecting a propagation model based on the availability of one or more databases for the geographic region including a terrain database, a morphology database, a permittivity/conductivity database, a foliage database, a measurement database, and a resource database.

5. The method of claim 1, wherein estimating a path loss comprises applying data from the one or more environmental databases in a path loss estimation program along with resource data, including but not limited to, height of a transmitter or receiver, frequency, and location of one or more wireless devices.

6. A system for real-time propagation analysis, the system comprising:
a plurality of dynamic environmental databases;
a dynamic propagation model database, the database including a plurality of propagation models;
a measurement database;
a resource database;
a processor;
a non-transitory computer readable medium, coupled to the processor, the non-transitory computer readable medium for storing a plurality of programs for running on the processor, the programs including:
a path loss estimation engine that, when run on the processor,
selects, in real-time, a propagation model from the plurality of models in the dynamic propagation model database, based on the availability of one or more of the databases in the plurality of dynamic environmental databases, the measurement database, or the resource database,
calculates propagation losses in real-time for a communication channel between wireless devices using the plurality of dynamic environmental databases and the propagation model selected from the plurality of propagation models in the dynamic propagation model database, and
adjusts parameters of at least one of the wireless devices based on the estimated path loss from the selected propagation model to enable communication between the wireless devices over the communication channel.

7. The system of claim 6, and further including an environmental tuning program, stored on the non-transitory computer readable medium, that, when run on the processor, causes the processor to tune one or more of the plurality of dynamic environmental databases based on new environmental information.

8. The system of claim 7, and further including a propagation model tuning program, stored on the non-transitory computer readable medium, that, when run on the processor, causes the processor to update at least one propagation model in the dynamic propagation model database based on new measurement data in the measurement database.

9. The system of claim 6, wherein the measurement database is a database that includes radio frequency measurements for communication channels for specified geographic regions.

10. The system of claim 6, wherein the resource database is a database that includes information on the location, height and frequencies of operation for a number of transceivers associated with a communication system.

* * * * *